(12) United States Patent
Ishii

(10) Patent No.: US 7,586,552 B2
(45) Date of Patent: Sep. 8, 2009

(54) CIRCUIT BOARD FOR ELECTRO-OPTICAL DEVICE, ELECTRO-OPTICAL DEVICE, AND ELECTRONIC APPARATUS

(75) Inventor: Tatsuya Ishii, Chitose (JP)

(73) Assignee: Seiko Epson Corporation, Tokyo (JP)

( * ) Notice: Subject to any disclaimer, the term of this patent is extended or adjusted under 35 U.S.C. 154(b) by 82 days.

(21) Appl. No.: 12/026,185

(22) Filed: Feb. 5, 2008

(65) Prior Publication Data

US 2008/0192159 A1 Aug. 14, 2008

(30) Foreign Application Priority Data

Feb. 8, 2007 (JP) ............................. 2007-028845

(51) Int. Cl.
*G02F 1/1343* (2006.01)
(52) U.S. Cl. .......................................... 349/39; 349/38

(58) Field of Classification Search .................... 349/38, 349/39
See application file for complete search history.

(56) References Cited

FOREIGN PATENT DOCUMENTS

JP 2001-281684 10/2001
JP 2006-317903 11/2006

*Primary Examiner*—Frank G Font
*Assistant Examiner*—Erin D Chiem
(74) *Attorney, Agent, or Firm*—Workman Nydegger

(57) ABSTRACT

An electro-optical device includes a pixel electrode, a transistor for driving the pixel electrode, and a storage capacitor for maintaining the voltage applied to the pixel electrode. The pixel electrode includes a first relay electrode formed in a layer above the pixel-electric-potential-side capacitor electrode of the storage capacitor with the interlayer insulation film sandwiched therebetween. The first relay electrode is electrically connected to the pixel-electric-potential-side capacitor electrode through the first contact hole.

9 Claims, 5 Drawing Sheets

CIRCUIT BOARD FOR ELECTRO-OPTICAL DEVICE, ELECTRO-OPTICAL DEVICE, AND ELECTRONIC APPARATUS

BACKGROUND

1. Technical Field

The present invention relates to a circuit board that is used for a variety of electro-optical devices such as a liquid crystal device, and further relates to the electro-optical device that is provided with the above-mentioned circuit substrate. In addition, the present invention relates to an electronic apparatus that is provided with such an electro-optical device having the above-mentioned circuit substrate. A non-limiting example of an electronic apparatus to which the present invention relates is a liquid crystal projector.

2. Related Art

A typical electro-optical device has, over its substrate, a plurality of pixel electrodes, a plurality of scanning lines for selectively driving the pixel electrodes, a plurality of data lines, and a plurality of thin film transistors (TFT) each of which functions as a pixel-switching element. An electro-optical device having such a configuration is capable of operating in an active-matrix driving scheme. A lamination structure that is made up of a plurality of functional films deposited one on another is formed over the substrate of an electro-optical device, where, in such a lamination structure, the functional films include electro-conductive films, semiconductor films, and the like, that constitute scanning lines, data lines, TFTs, and the like so as to correspond to each one of individual pixels. For each pixel, the pixel electrode is formed at the uppermost layer, though not necessarily limited thereto, of the lamination structure.

In some related-art lamination structure of a circuit board for an electro-optical device, for example, as disclosed in JP-A-2001-281684, a storage capacitor is formed between a TFT and a pixel electrode in order to enhance contrast thereof. The storage capacitor is made up of a lower capacitor electrode, an upper capacitor electrode, and a dielectric film that is sandwiched between the lower capacitor electrode and the upper capacitor electrode. In the lamination structure of the related art, the upper capacitor electrode, which is provided at a layer over the counterpart layer of the lower capacitor electrode, is electrically connected to the TFT via a contact hole that is formed to penetrate through the dielectric film deposited immediately under the upper capacitor electrode.

In the manufacturing process of an electro-optical device of the related art, the formation of a contact hole is performed as follows. Before the formation of an upper capacitor electrode on a dielectric film, a resist is applied to the dielectric film so as to form a resist coating thereon. Then, etching treatment is applied to the dielectric film while using the resist film as a mask. In this way, a contact hole is bored through the dielectric film.

In order to manufacture the lamination structure of the related art described above, it is necessary to form a resist mask on the surface of a dielectric film in the process of forming a contact hole that goes through the dielectric film. In addition, it is also necessary to remove the resist mask after the formation of the contact hole. For this reason, there is an adverse possibility that the surface of the dielectric film might become polluted by any residual resist that remains without being removed completely. As an example of another possible risks, the actual film thickness of the dielectric film might deviate from its designed ideal film thickness because the surface of the dielectric film might get "eroded away" in such a contact-hole formation process. Generally speaking, a dielectric film requires precision in surface control; that is, the surface of a dielectric film is required to meet strict design criteria in order to ensure the reliable performance of a storage capacitor. However, if the surface of a dielectric film is subjected to some kind of treatment such as the above-described contact-hole formation treatment before the formation of an upper capacitor electrode, it is possible that the surface of the dielectric film gets degraded in quality because of the pollution or the film thickness deviation thereof as described above, which poses a technical problem that has not yet been solved by the related art. In other words, the lamination structure of the related art described above has a risk in that the above-described possible degradation in the quality of a dielectric film causes a decrease in the withstanding pressure of the dielectric film. As a disadvantageous consequence thereof, a leakage current might increase.

SUMMARY

An advantage of some aspects of the invention is to provide a circuit board (which may be referred to as "circuit substrate" throughout this specification as long as the context allows without any intention to limit the invention) used for an electro-optical device that makes it possible to improve the quality of a dielectric film that constitutes a part of a storage capacitor, thereby making it possible to display a high-quality image. The invention further provides, advantageously, an electro-optical device that is provided with such a circuit board and an electronic apparatus that is provided with the electro-optical device having such a circuit board.

In order to address the above-identified problem without any limitation thereto, the invention provides, as a first aspect thereof, a circuit board used for an electro-optical device, the circuit board including: a substrate; a plurality of data lines that is formed over the substrate and a plurality of scanning lines that is formed over the substrate, the plurality of data lines and the plurality of scanning lines intersecting with each other; a plurality of transistors that is formed over the substrate, the transistor being provided in each pixel corresponding to an intersection formed by the data line and the scanning line; a plurality of storage capacitors each of which is formed at a layer above (or over, the same applies hereunder) the transistor over the substrate, the storage capacitor having a fixed-electric-potential-side capacitor electrode, a dielectric film, and a pixel-electric-potential-side capacitor electrode, the fixed-electric-potential-side capacitor electrode being a lower layer of the storage capacitor, the pixel-electric-potential-side capacitor electrode being an upper layer of the storage capacitor, and the dielectric film being sandwiched between the fixed-electric-potential-side capacitor electrode and the pixel-electric-potential-side capacitor electrode; and a plurality of pixel electrodes that is formed over the substrate, each of the plurality of pixel electrodes being provided in a pixel, the pixel electrode being electrically connected to the pixel-electric-potential-side capacitor electrode, wherein the pixel electrode functions as a first relay electrode that is formed over the substrate, the first relay electrode being formed at a layer above the pixel-electric-potential-side capacitor electrode with an inter-bedded insulation film being sandwiched between the first relay electrode and the pixel-electric-potential-side capacitor electrode, the first relay electrode being electrically connected to the pixel-electric-potential-side capacitor electrode via a first contact hole that is formed to go through the inter-bedded insulation film, the first relay electrode providing an electric relay connection between the pixel-electric-potential-side capacitor electrode and the transistor.

In order to address the above-identified problem without any limitation thereto, the invention provides, as a second aspect thereof, a circuit board used for an electro-optical device, the circuit board including: a substrate; a plurality of data lines that is formed over the substrate and a plurality of scanning lines that is formed over the substrate, the plurality of data lines and the plurality of scanning lines intersecting with each other; a plurality of transistors that is formed over the substrate, the transistor being provided in each pixel corresponding to an intersection formed by the data line and the scanning line; a plurality of storage capacitors each of which is formed at a layer above the transistor over the substrate, the storage capacitor having a fixed-electric-potential-side capacitor electrode, a dielectric film, and a pixel-electric-potential-side capacitor electrode, the fixed-electric-potential-side capacitor electrode being a lower layer of the storage capacitor, the pixel-electric-potential-side capacitor electrode being an upper layer of the storage capacitor, and the dielectric film being sandwiched between the fixed-electric-potential-side capacitor electrode and the pixel-electric-potential-side capacitor electrode; a plurality of pixel electrodes that is formed over the substrate, each of the plurality of pixel electrodes being provided in a pixel, the pixel electrode being electrically connected to the pixel-electric-potential-side capacitor electrode; and a plurality of first relay electrodes each of which is formed over the substrate, the first relay electrode being formed at a layer above the pixel-electric-potential-side capacitor electrode with an inter-bedded insulation film being sandwiched between the first relay electrode and the pixel-electric-potential-side capacitor electrode, the first relay electrode being electrically connected to the pixel-electric-potential-side capacitor electrode via a first contact hole that is formed to go through the inter-bedded insulation film, the first relay electrode providing an electric relay connection between the pixel-electric-potential-side capacitor electrode and the transistor.

In the configuration of a circuit board used for an electro-optical device according to the first aspect of the invention described above or according to the second aspect of the invention described above, at the time of operation thereof, scanning signals are supplied from scanning lines to transistors in a line sequential manner, whereas image signals are supplied from data lines and, via transistors, written into pixel electrodes and storage capacitors. By this means, a circuit board used for an electro-optical device according to the first aspect of the invention described above or according to the second aspect of the invention described above makes it possible for an electro-optical device to perform various kinds of operations conforming to an active-matrix driving scheme in a plurality of pixels thereof. Thanks to the functioning of a storage capacitor in each of the plurality of pixels thereof, the electric potential retention property at the pixel electrode is improved, making it possible to improve display characteristics, which could be perceived as an enhanced contrast and/or reduced flickers, though not limited thereto.

In the configuration of a circuit board used for an electro-optical device according to the first aspect of the invention described above or according to the second aspect of the invention described above, the storage capacitor is made up of the fixed-electric-potential-side capacitor electrode, the pixel-electric-potential-side capacitor electrode, and the dielectric film that is sandwiched between the fixed-electric-potential-side capacitor electrode and the pixel-electric-potential-side capacitor electrode. In such a configuration, the fixed-electric-potential-side capacitor electrode is configured as a lower capacitor electrode, whereas the pixel-electric-potential-side capacitor electrode is configured as an upper capacitor electrode. In the lamination structure of a circuit board used for an electro-optical device according to the first aspect of the invention described above or according to the second aspect of the invention described above, the pixel-electric-potential-side capacitor electrode, that is, the upper capacitor electrode, is formed at a layer over the fixed-electric-potential-side capacitor electrode, that is, the lower capacitor electrode. The pixel-electric-potential-side capacitor electrode is electrically connected to the pixel electrode, which is formed at a layer above the pixel-electric-potential-side capacitor electrode. The dielectric film is formed on, for example, a non-open region that lies at each gap between open regions of pixels. At the time of operation of an electro-optical device, the fixed-electric-potential-side capacitor electrode maintains a fixed electric potential for, at least, a predetermined time period/interval regardless of the content of image data. In other words, as if it were a ground electric potential, the fixed-electric-potential-side capacitor electrode maintains a completely (or "non-alternately") fixed electric potential with respect to a time axis. Notwithstanding the foregoing, as an example of modified configurations of the above, the fixed-electric-potential-side capacitor electrode may maintain a fixed electric potential in an alternate manner with respect to a time axis; specifically, the fixed-electric-potential-side capacitor electrode may be fixed at a first fixed electric potential during an odd field time period of an image signal and fixed at a second fixed electric potential during an even field time period of the image signal, as if it were a common electrode electric potential or a counter electrode electric potential.

In the configuration of a circuit board used for an electro-optical device according to the first aspect of the invention described above or according to the second aspect of the invention described above, a first relay electrode is formed over the substrate. In such a configuration, the first relay electrode, which is formed at a layer above the storage capacitor, provides an electric relay connection between the pixel-electric-potential-side capacitor electrode and the transistor (or, in other words, the first relay electrode relays an electric connection between the pixel-electric-potential-side capacitor electrode and the transistor). The first relay electrode is formed at a layer above the pixel-electric-potential-side capacitor electrode with an inter-bedded insulation film being sandwiched between the first relay electrode and the pixel-electric-potential-side capacitor electrode. The first relay electrode is electrically connected to the pixel-electric-potential-side capacitor electrode via a first contact hole that is formed to go through the inter-bedded insulation film. In addition, the first relay electrode is electrically connected to the transistor that is formed at a layer below (or under, the same applies hereunder) the storage capacitor via a second contact hole that is formed to go through, at least, the inter-bedded insulation film and the dielectric film. It should be particularly noted that, in the configuration of a circuit board used for an electro-optical device according to the invention described above, the pixel electrode may be electrically connected to the pixel-electric-potential-side capacitor electrode via the first relay electrode that is formed at a layer above the pixel-electric-potential-side capacitor electrode, or (the pixel electrode) may function as the first relay electrode and provide an electric relay connection between the pixel-electric-potential-side capacitor electrode and the transistor.

Therefore, when manufacturing a circuit board used for an electro-optical device according to the first aspect of the invention described above or according to the second aspect of the invention described above, the first contact hole that provides an electric connection between the first relay electrode and the pixel-electric-potential-side capacitor electrode is bored to penetrate through the inter-bedded insulation film after the formation of the pixel-electric-potential-side capacitor electrode, that is, the upper capacitor electrode. That is, the first contact hole is formed to go through the inter-bedded insulation film, which is deposited at a layer over the pixel-electric-potential-side capacitor electrode, after the formation of the storage capacitor. In addition, the second contact hole that provides an electric connection between the first relay electrode and the transistor that is formed at a layer below the storage capacitor is also bored to penetrate through the inter-bedded insulation film and further through the dielectric film after the formation of the storage capacitor. That is, it is possible to form the second contact hole that penetrates through the inter-bedded insulation film and the dielectric film concurrently with the formation of the first contact hole, that is, in the same (i.e., single) contact-hole-formation step as that of the first contact hole.

Therefore, in the manufacturing process of a circuit board used for an electro-optical device according to the first aspect of the invention described above or according to the second aspect of the invention described above, it is not necessary to form any contact hole that penetrates through the dielectric film for the purpose of electrically connecting the pixel-electric-potential-side capacitor electrode to the transistor that is provided at a layer below the pixel-electric-potential-side capacitor electrode through the contact hole bored through the dielectric film. This means that the above-described "bypass" configuration of a circuit board used for an electro-optical device according to the invention eliminates the need for applying a resist to the surface of the dielectric film and then removing the resist from the surface of the dielectric film. By this means, it is possible to avoid the surface of the dielectric film from becoming polluted or eroded away due to the application of a resist thereto and the removal of the resist therefrom. That is, it is possible to increase the precision in the surface control of the dielectric film in the production of a circuit board used for an electro-optical device according to the first aspect of the invention described above or according to the second aspect of the invention described above. Or, in other words, it is possible to prevent any degradation in the quality of the dielectric film after formation thereof. Therefore, it is possible to effectively reduce the risk of, or completely prevent, the occurrence of an operation failure of the storage capacitor, including but not limited to, the generation of a leakage current due to a decrease in the withstanding pressure of the dielectric film. Thus, a circuit board used for an electro-optical device according to the first aspect of the invention described above or according to the second aspect of the invention described above makes it possible to display a high-quality image with enhanced reliability.

As explained above, with the configuration of a circuit board used for an electro-optical device according to the first aspect of the invention described above or according to the second aspect of the invention described above, it is possible to improve the quality of the dielectric film that constitutes a part of the storage capacitor. Therefore, it is possible to effectively reduce the risk of, or completely prevent, the occurrence of an operation failure of the storage capacitor.

In the configuration of a circuit board used for an electro-optical device according to the invention, it is advantageous, and thus preferable, if the pixel electrode is configured to function as the first relay electrode.

If so configured, the pixel-electric-potential-side capacitor electrode is electrically connected to the pixel electrode via the first contact hole that is bored above the pixel-electric-potential-side capacitor electrode; with such a configuration, the pixel-electric-potential-side capacitor electrode is electrically connected to the transistor via the pixel electrode. Therefore, with the advantageous configuration described in the preceding paragraph, since the pixel electrode has double functions and also serves as the first relay electrode in addition to its usual function of a pixel electrode, which eliminates the need for providing another relay electrode (i.e., separate first relay electrode) at a layer over the pixel-electric-potential-side capacitor electrode (e.g., at a certain interlayer between the pixel-electric-potential-side capacitor electrode and the pixel electrode in the lamination structure of the circuit board), it is possible to simplify the lamination structure of each pixel and/or the layout of various kinds of constituent elements formed in the lamination structure thereof.

In the configuration of a circuit board used for an electro-optical device according to the first aspect of the invention described above or according to the second aspect of the invention described above, it is preferable that the storage capacitor should be formed at a layer above the data line.

With such a configuration, it is possible to ensure a relatively large electric capacity of the storage capacitor. In addition, it is further possible to stabilize the electric potential of the pixel electrode.

If the storage capacitor is formed at a layer below the data line in the lamination structure formed over the substrate, or, in other words, if the data line is formed at a layer above the storage capacitor in the lamination structure formed over the substrate, which is not the case for the preferred configuration of a circuit board used for an electro-optical device described above, it is necessary to determine the formation region of the storage capacitor so that the storage capacitor does not overlap, in a plan view, a contact hole that is formed to provide an electric connection between the data line, which is formed at the layer above the storage capacitor, and the transistor, which is formed at the layer below the storage capacitor. This means that an area where the storage capacitor can be formed is limited. In contrast, in the preferred configuration of a circuit board used for an electro-optical device described above, the storage capacitor is formed at a layer above the data line. Therefore, it is possible to form the storage capacitor at an upper region that overlaps the contact hole that provides an electric connection between the data line and the transistor in a plan view. Therefore, with the preferred configuration of a circuit board used for an electro-optical device described above, it is possible to allocate a relatively large area for the formation of the storage capacitor over the substrate. By this means, it is possible to ensure a relatively large electric capacity value of the storage capacitor.

In the lamination structure of a circuit board used for an electro-optical device described above, the storage capacitor is formed at a layer between the pixel electrode and the data line. When attention is focused on the three-dimensional layout of the storage capacitor and the data line in the lamination structure formed over the substrate, it is possible to interpose the fixed-electric-potential-side capacitor electrode between the pixel-electric-potential-side capacitor electrode and the data line. Therefore, the preferred lamination structure of a circuit board used for an electro-optical device described above ensures that neither the pixel electrode nor the pixel-electric-potential-side capacitor electrode is formed in the proximity of the data line. In addition, since the fixed-electric-potential-side capacitor electrode is provided between the data line and the pixel electrode/pixel-electric-potential-side capacitor electrode in the preferred lamination structure of a circuit board used for an electro-optical device described above, in comparison with a case where the fixed-electric-potential-side capacitor electrode is not provided therebetween, it is possible to effectively shield the electromagnetic interference of the data line. Thus, it is possible to prevent the electromagnetic interference of the data line from causing a fluctuation/variation in the electric potential of each of the pixel electrode or the pixel-electric-potential-side capacitor electrode. Or, even if it occurs slightly, it is possible to, at least, minimize the fluctuation/variation in the electric potential thereof to a satisfactory level where no visually perceivable display problem arises.

It is preferable that a circuit board used for an electro-optical device having the above-described preferred configuration in which the storage capacitor is formed at a layer above the data line should include a second relay electrode that is made of the same film as that of an electro-conductive film that constitutes at least one of the fixed-electric-potential-side capacitor electrode and the data line, the second relay electrode providing an electric relay connection between the first relay electrode and the transistor.

If so configured, since the second relay electrode provides an electric relay connection between the first relay electrode and the transistor, it is possible to establish an electric connection therebetween even in a case where the inter-bedded (i.e., layer-to-layer) distance between the first relay electrode and the transistor is too long for a single contact hole to provide an electric connection therebetween. In addition, the second relay electrode makes it possible to reduce an electric resistance (i.e., achieves a lower electric resistance) between the first relay electrode and the transistor, or, in other words, between the pixel-electric-potential-side capacitor electrode and the transistor. Moreover, in comparison with a case where the second relay electrode is formed at a layer that is not the same as that of the fixed-electric-potential-side capacitor electrode/data line, it is possible to simplify the lamination structure of each pixel and/or the layout of various kinds of constituent elements formed in the lamination structure. In addition, since the preferred configuration of a circuit board used for an electro-optical device described above makes it possible to form the second relay electrode at the same single formation process as that of the fixed-electric-potential-side capacitor electrode/data line, it is possible to simplify the manufacturing process thereof.

In the context of this specification and appended claims, the term "same film" means two (or more) films that are formed concurrently with each other (or one another) in the same single film formation process. Thus, it means the same single kind of film. In addition, in the context of this specification and appended claims, the phrase "is made of the same film" does not mean that two (or more) elements are formed together as a single sheet of film having a "non-isolated pattern". The phrase "is made of the same film" applies two (or more) elements that are isolated (i.e., have an isolated pattern) from each other (or one another) though they constitute the same single kind of film.

In the preferred configuration of a circuit board used for an electro-optical device described above in which the second relay electrode is provided, it is preferable that the second relay electrode should include or constitute one relay electrode that is made of the same film as that of the fixed-electric-potential-side capacitor electrode; and the first relay electrode and the above-mentioned one relay electrode are electrically connected to each other via a second contact hole that is formed to go through the inter-bedded insulation film and the dielectric film.

With such a preferred configuration, it is possible to easily form the first contact hole and the second contact hole in the same single contact-hole-formation step, thereby achieving a simplified manufacturing process. For example, it is assumed that the inter-bedded distance between the first relay electrode and the above-mentioned one relay electrode is larger than the inter-bedded distance between the first relay electrode and the pixel-electric-potential-side capacitor electrode by, for example, the film thickness of the dielectric film. In spite of the difference in these inter-bedded distances, it is still possible to prevent the formed first contact hole from exceeding a desired depth and thus penetrating through or into the pixel-electric-potential-side capacitor electrode while forming the second contact hole, which provides an electric connection between the first relay electrode and the above-mentioned one relay electrode, at a desired depth because the film thickness of the dielectric film is configured to be smaller than the film thickness of the pixel-electric-potential-side capacitor electrode.

In the preferred configuration of a circuit board used for an electro-optical device described above in which the second relay electrode includes or constitutes one relay electrode, it is preferable that the pixel-electric-potential-side capacitor electrode should have a film thickness that is smaller than a film thickness of the data line and a film thickness of the fixed-electric-potential-side capacitor electrode.

With such a preferred configuration, it is possible to easily form the first contact hole and the second contact hole in the same single contact-hole-formation step even in a case where the surface of the inter-bedded insulation film is subjected to planarization processing (i.e., smoothing treatment) by means of a chemical mechanical polishing (CMP). It is assumed that the inter-bedded distance between the first relay electrode and the above-mentioned one relay electrode is larger than the inter-bedded distance between the first relay electrode and the pixel-electric-potential-side capacitor electrode by, for example, an aggregate film thickness that is the sum of the film thickness of the pixel-electric-potential-side capacitor electrode and the film thickness of the dielectric film. In spite of the difference in these inter-bedded distances, it is still possible to prevent the formed first contact hole from exceeding a desired depth and thus penetrating through or into the pixel-electric-potential-side capacitor electrode while forming the second contact hole, which provides an electric connection between the first relay electrode and the above-mentioned one relay electrode, at a desired depth because the film thickness of the pixel-electric-potential-side capacitor is configured to be smaller than both the film thickness of the fixed-electric-potential-side capacitor electrode and the film thickness of the data line.

In the (preferred) configuration of a circuit board used for an electro-optical device described above, it is preferable that each of the pixel-electric-potential-side capacitor electrode and the fixed-electric-potential-side capacitor electrode should be made of a metal film.

That is, each of the pixel-electric-potential-side capacitor electrode and the fixed-electric-potential-side capacitor electrode is made of a metal film containing a metal material. Specifically, each of the pixel-electric-potential-side capacitor electrode and the fixed-electric-potential-side capacitor electrode may be made of a single-layer metal film. Alternatively, each of the pixel-electric-potential-side capacitor electrode and the fixed-electric-potential-side capacitor electrode may be made of a multi-layer film that is made up of a plurality of laminated layers containing a metal film(s) and other electro-conductive film(s) that is made of an electro-conductive material(s).

Therefore, in comparison with a case where each of the pixel-electric-potential-side capacitor electrode and the fixed-electric-potential-side capacitor electrode is made of, for example, an electro-conductive material containing polysilicon, the above-described configuration makes it possible to reduce an electric resistance for each of the pixel-electric-potential-side capacitor electrode and the fixed-electric-potential-side capacitor electrode. In addition, it is possible to form the storage capacitor having a Metal Insulator Metal (MIM) structure. By this means, the above-described configuration makes it possible to form the dielectric film by means of a dielectric material having a high dielectric constant, that is, a "High-k" material. Thus, it is possible to ensure a relatively large electric capacity of the storage capacitor.

It is preferable that a circuit board used for an electro-optical device having the above-described preferred configuration in which each of the pixel-electric-potential-side capacitor electrode and the fixed-electric-potential-side capacitor electrode is made of a metal film should further include a plurality of capacitor lines formed over the substrate, each of the capacitor lines being electrically connected to the fixed-electric-potential-side capacitor electrode.

In such a configuration, the capacitor line can be made of the same film as that of the fixed-electric-potential-side capacitor electrode so as to constitute a single pattern. If so configured, it is possible to reduce the electric resistance (i.e., achieves a lower electric resistance) of the capacitor line and to stabilize both the electric potential of the capacitor line and the electric potential of the fixed-electric-potential-side capacitor electrode.

Each one of the plurality of capacitor lines is formed in such a manner that it extends along a direction in which either the scanning line or the data line extends. The capacitor line may be configured as a common line that is shared by a plurality of pixels that is aligned along the scanning line. Or, the capacitor line may be configured as a common line that is shared by a plurality of pixels that is aligned along the data line. That is, the capacitor lines may be arrayed in a stripe pattern. Alternatively, the capacitor line may be configured as a common line that is shared by a plurality of pixels that is aligned along the scanning line/along the data line. That is, the capacitor lines may be arrayed in a grid pattern. With such a configuration, the capacitor line occupies a relatively large pattern area over the substrate, which is equivalent to the pattern area of the scanning line and/or the data line formed over the substrate. If the capacitor line is made of the same film as that of the fixed-electric-potential-side capacitor electrode so as to constitute a single pattern, it is possible to ensure a relatively large electric capacity value of the storage capacitor. In addition, although the pattern area of the capacitor line formed over the substrate is relatively large, it is possible to reduce an electric resistance thereof because the capacitor line is made of the same film as that of the fixed-electric-potential-side capacitor electrode so as to constitute a single pattern.

In the preferred configuration of a circuit board used for an electro-optical device described above in which each of the pixel-electric-potential-side capacitor electrode and the fixed-electric-potential-side capacitor electrode is made of a metal film, it is preferable that the data line should be made of a metal film.

With such a configuration, it is possible to reduce the electric resistance of the data line and to stabilize the electric potential of the data line.

In addition, each of the pixel-electric-potential-side capacitor electrode, the fixed-electric-potential-side capacitor electrode, and the data line can be made of a metal film that is deposited at a layer different from those of other two metal films. The metal film layer that constitutes the data line and the metal film layer that constitutes the fixed-electric-potential-side capacitor electrode are electrically insulated from each other with an inter-bedded insulation film being sandwiched therebetween. The metal film layer that constitutes the fixed-electric-potential-side capacitor electrode and the metal film layer that constitutes the pixel-electric-potential-side capacitor electrode are also electrically insulated from each other with the dielectric film being sandwiched therebetween. As has already been described above, each of the pixel-electric-potential-side capacitor electrode, the fixed-electric-potential-side capacitor electrode, and the data line may be made of a single-layer metal film. Alternatively, each of the pixel-electric-potential-side capacitor electrode, the fixed-electric-potential-side capacitor electrode, and the data line may be made of a multi-layer film that is made up of a plurality of laminated layers containing a metal film(s) and other electro-conductive film(s) that is made of an electro-conductive material(s) Since these three layers of metal films are deposited over the transistor provided over the substrate, it is possible to shut off any incident light coming through upper layers that are deposited above these three metal film layers with an increased reliability. Therefore, these three light-shielding metal film layers effectively reduce the generation of an optical leakage current at the transistor.

In order to address the above-identified problem without any limitation thereto, the invention provides, as another aspect thereof, an electro-optical device that is provided with the circuit board used for an electro-optical device having the configuration described above, including its preferred configurations.

Since an electro-optical device is provided with the circuit board having the configuration described above, it is possible to display a high-quality image.

In order to address the above-identified problem without any limitation thereto, the invention provides, as still another aspect thereof, an electronic apparatus that is provided with the electro-optical device having the circuit board described above.

According to an electronic apparatus of this aspect of the invention, it is possible to embody various kinds of electronic devices that are capable of providing a high-quality image display, including but not limited to, a projection-type display device, a mobile phone, an electronic personal organizer, a word processor, a viewfinder-type video tape recorder, a direct-monitor-view-type video tape recorder, a workstation, a videophone, a POS terminal, a touch-panel device, and so forth because it is provided with the electro-optical device that has the circuit board having the configuration described above. In addition, an electronic apparatus of this aspect of the invention further makes it possible to embody a variety of image formation apparatuses such as a printer, a copying machine, a facsimile machine that adopts the electro-optical device having the circuit board described above. In addition, as an example of an electronic apparatus of this aspect of the invention, it is possible to embody an electrophoresis apparatus such as an electronic paper.

These and other features, operations, and advantages of the present invention will be fully understood by referring to the following detailed description in conjunction with the accompanying drawings.

BRIEF DESCRIPTION OF THE DRAWINGS

The invention will be described with reference to the accompanying drawings, wherein like numbers reference like elements.

DESCRIPTION OF EXEMPLARY EMBODIMENTS

With reference to the accompanying drawings, exemplary embodiments of the present invention are described below. In the following exemplary embodiments of the invention, a liquid crystal device that conforms to a TFT active-matrix driving scheme is taken as an example of various kinds of electro-optical devices according to the invention. It is assumed that the liquid crystal device explained in the following description is provided with a built-in driving circuit.

Figure 1:
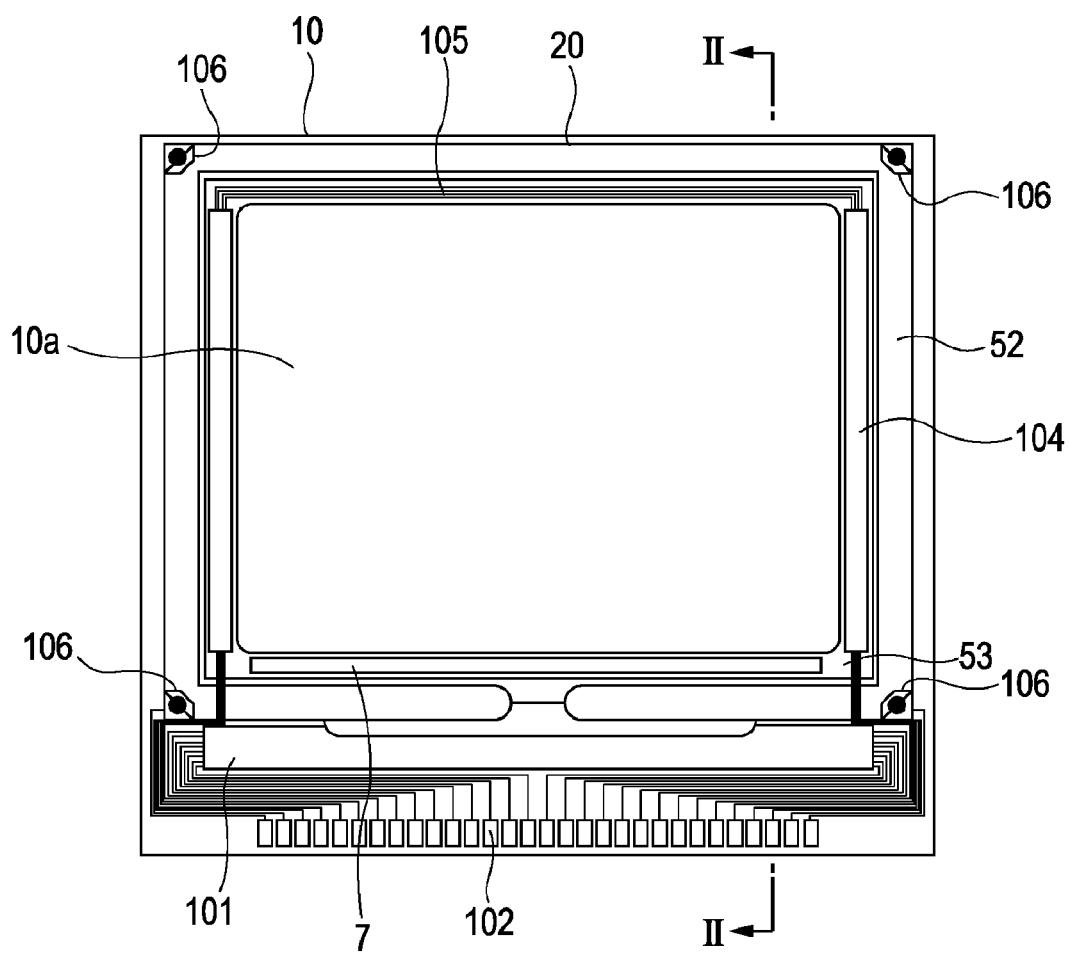
FIG. 1 is a plan view that schematically illustrates an example of the configuration of a liquid crystal device according to an exemplary embodiment of the invention.
Figure 2:
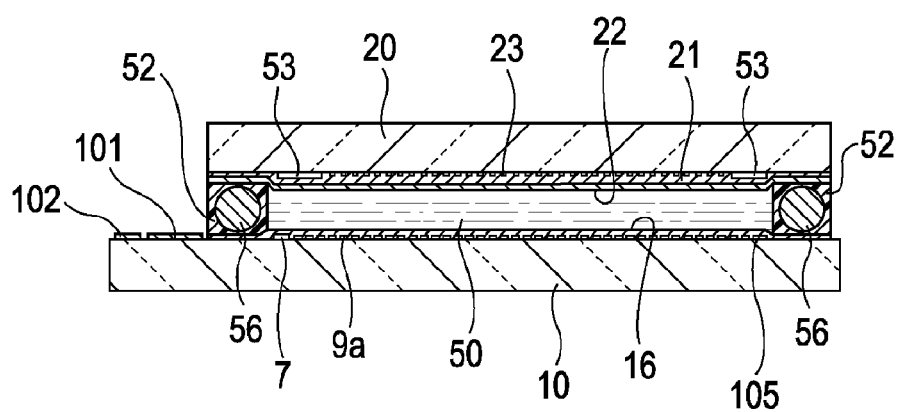
FIG. 2 is a sectional view taken along the line II-II of FIG. 1.

First of all, an example of the general and overall configuration of a liquid crystal device according to the present embodiment of the invention is explained while referring to FIGS. 1 and 2.

FIG. 1 is a plan view that schematically illustrates an example of the configuration of a TFT array substrate and various components formed or deposited thereon, which are viewed in combination from a certain point at the counter-substrate side. FIG. 2 is a cross sectional view taken along the line II-II of FIG. 1.

As shown in FIGS. 1 and 2, in the configuration of a liquid crystal device according to the present embodiment of the invention, a TFT array substrate 10 and a counter substrate (which may be referred to as "opposite substrate" in the following description) 20 are arranged opposite to each other. The TFT array substrate 10 is configured as a transparent substrate that is made of, for example, a quartz substrate, a glass substrate, a silicon substrate, or the like. The counter substrate 20 is also configured as a transparent substrate that is made of the same material as that of the TFT array substrate 10, though not necessarily limited thereto. A liquid crystal layer 50 is sealed between the TFT array substrate 10 and the counter substrate 20. The TFT array substrate 10 and the counter substrate 20 are bonded to each other with the use of a sealant material 52 that is provided at a sealing region around an image display region 10a.

The sealant material 52 is made from, for example, an ultraviolet (UV) curable resin, a thermosetting resin, or the like, which functions to paste these substrates together. In the production process of the liquid crystal device, the sealant material 52 is applied onto the TFT array substrate 10 and subsequently hardened through an ultraviolet irradiation treatment, a heat treatment, or any other appropriate treatment. A gap material 56 such as glass fibers, glass beads, or the like, are scattered in the sealant material 52 so as to set the distance (i.e., inter-substrate gap) between the TFT array substrate 10 and the counter substrate 20 at a predetermined gap value. A liquid crystal device according to the present embodiment of the invention is suitable for providing an enlarged display with a compact body, and especially preferable to be used as a light valve for a projector among many uses thereof.

Inside the sealing region at which the sealant material 52 is provided, and in parallel therewith, a picture frame light-shielding film 53, which has a light-shielding property and defines the picture frame region of the image display region 10a, is provided on the counter substrate 20. Notwithstanding the above, a part or a whole of the picture frame light-shielding film 53 may be provided at the TFT array substrate (10) side as a built-in light-shielding film.

A data line driving circuit 101, a sampling circuit 7, a scanning line driving circuit(s) 104, and external circuit connection terminals 102 are formed at peripheral regions around the above-mentioned image display region 10a on the TFT array substrate 10.

Among the peripheral regions (or, in other words, several regions that make up a peripheral region), which lie at the periphery of the image display region 10a, the data line driving circuit 101 and the external circuit connection terminals 102 are provided at one region which lies outside the sealing region at which the sealant material 52 is provided in such a manner that these data line driving circuit 101 and external circuit connection terminals 102 are provided along one of four sides of the TFT array substrate 10. On the other hand, among the peripheral regions that lie at the periphery of the image display region 10a, the sampling circuit 7 is provided at one region that lies inside the sealing region at which the sealant material 52 is provided. The sampling circuit 7 is provided along one of four sides of the image display region 10a in such a manner that the picture frame light-shielding film 53 encloses the sampling circuit 7.

A pair of scanning line driving circuits 104 is provided along two of four sides of the TFT array substrate 10 that are not in parallel with the above-mentioned one side in such a manner that each of the scanning line driving circuits 104 is enclosed by the picture frame light-shielding film 53. In addition to the above, a plurality of electric wirings 105 is provided along the remaining one side (i.e., one that is parallel with the first-mentioned side) of the TFT array substrate 10 in such a manner that the plurality of electric wirings 105 is enclosed by the picture frame light-shielding film 53 so as to electrically connect one of the pair of the scanning line driving circuits 104 that are provided outside the image display region 10a along the second-mentioned two sides of the TFT array substrate 10 to the other thereof.

Inter-substrate conductive terminals 106 are provided at the peripheral regions on the TFT array substrate 10, specifically, at positions corresponding to four corners of the counter substrate 20, respectively. In addition, inter-substrate conductive materials are provided between the TFT array substrate 10 and the counter substrate 20, specifically, at positions corresponding to the inter-substrate conductive terminals 106. The inter-substrate conductive terminals 106 and the inter-substrate conductive materials are configured to fit with each other so as to establish electric connection between the TFT array substrate 10 and the counter substrate 20.

As illustrated in FIG. 2, a layered structure (i.e., lamination structure) that includes laminations of TFTs for pixel switching, which are driving/driver elements, and of wirings/lines such as scanning lines, data lines, and the like is formed on the TFT array substrate 10. In the image display region 10a, pixel electrodes 9a are arranged/arrayed in a matrix pattern at a layer over the lamination structure(s) made up of the pixel-switching TFTs, the scanning lines, the data lines, and the like. Each of the pixel electrodes 9a is made of a transparent electro-conductive film such as an indium tin oxide (ITO) film, though not limited thereto. An alignment (i.e., orientation) film 16 is deposited on the pixel electrodes 9a. It should be noted that, in the present embodiment of the invention, the pixel-switching element is not limited to a TFT but may be configured as a transistor of an alternative type.

On the other hand, a light-shielding film 23 is deposited on the surface of the counter substrate 20 opposite the TFT array substrate 10. The light-shielding film 23 is made of, for example, a metal film having light-shielding property. The light-shielding film 23 is formed in a grid pattern in the image display region 10a on the counter substrate 20. The counter electrode 21, which is made of a transparent material such as an ITO film, is deposited "on" the light-shielding film 23 in a solid manner, that is, as a solid electrode. In other words, as illustrated in FIG. 2, the counter electrode 21 is formed under the light-shielding film 23 viewed along an orientation illustrated in the drawing. The counter electrode 21 that is formed as a solid electrode is opposed to the plurality of pixel electrodes 9a. Another alignment film 22 is deposited on the counter electrode 21. Again, in other words, as illustrated in FIG. 2, the above-mentioned another alignment film 22 is formed under the counter electrode 21 as understood from the drawing.

The liquid crystal layer 50 is made of liquid crystal that consists of, for example, a mixture of one or more types of nematic liquid crystal element. Such a liquid crystal takes a predetermined orientation state between a pair of the above orientation films (i.e., alignment films). When the liquid crystal device is driven for operation, a driving voltage is applied to each of the pixel electrode 9a and the counter electrode 21. As a result of the application of a voltage thereto, a liquid crystal retention volume (i.e., liquid crystal hold capacitance) is generated between the pixel electrode 9a and the counter electrode 21.

It should be noted that other functional circuits that are not specifically illustrated in the drawing might also be provided on the TFT array substrate 10 in addition to driving circuits such as the data line driving circuit 101 and the scanning line driving circuit(s) 104 described above. A non-limiting example of such other functional circuits includes but not limited to a pre-charge circuit that supplies a pre-charge signal having a predetermined voltage level to each of the plurality of data lines prior to the supplying of an image signal, and a test circuit for conducting an inspection on the quality, defects, and the like of the liquid crystal device during the production process or before shipment thereof.

Next, the electric configuration of the pixel unit (i.e., pixel portion) of a liquid crystal device according to the present embodiment of the invention is explained below with reference to FIG. 3.

Figure 3:
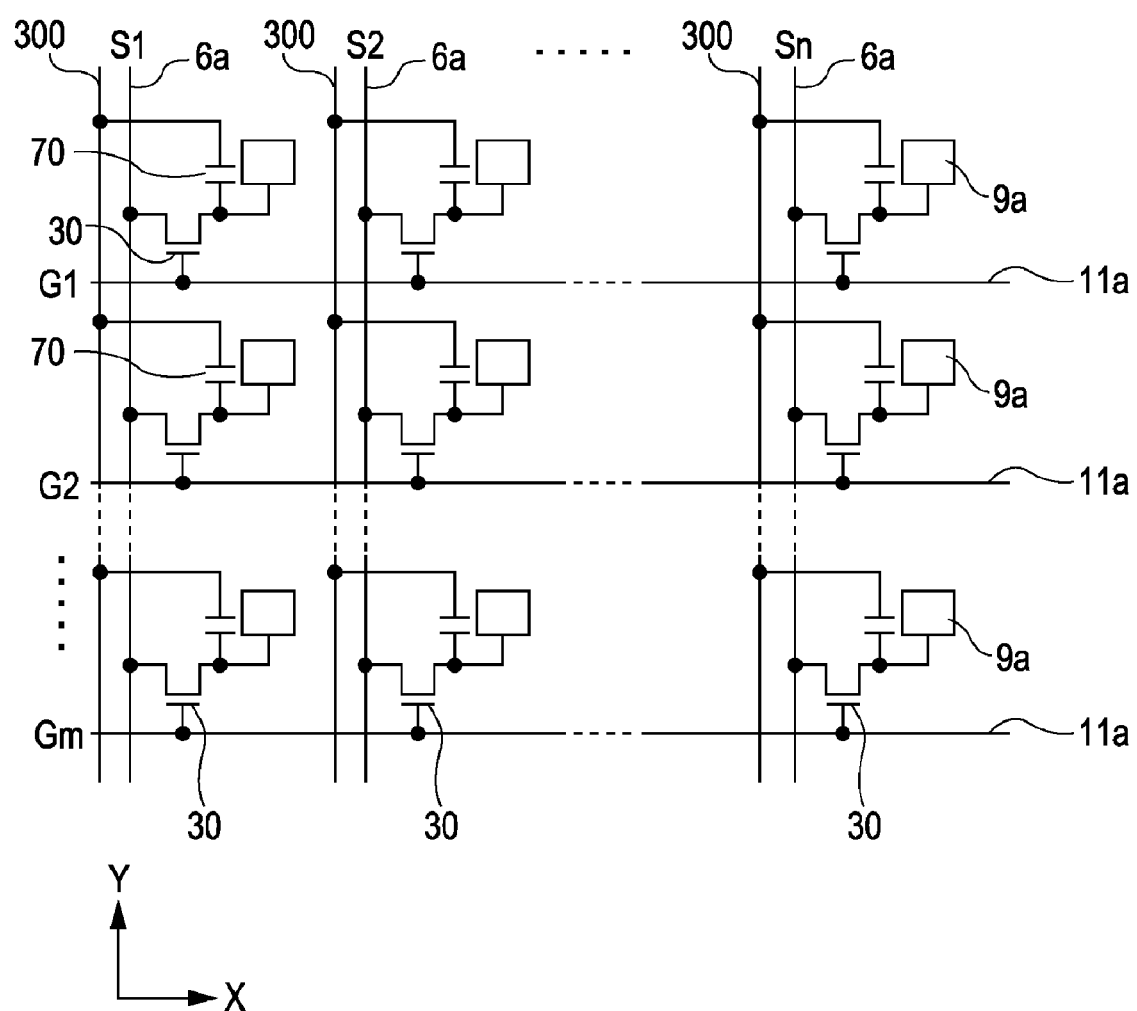
FIG. 3 is an equivalent circuit diagram that illustrates an example of a plurality of pixel units of a liquid crystal device according to an exemplary embodiment of the invention.

FIG. 3 is an equivalent circuit diagram that illustrates an example of constituent elements and wirings in a plurality of pixels that are arranged in a matrix pattern so as to constitute the image display region of a liquid crystal device according to the present embodiment of the invention.

As illustrated in FIG. 3, a TFT 30, which is an example of a "transistor" according to the invention, as well as the pixel electrode 9a is provided in each of the plurality of pixels that are arranged in a matrix pattern so as to constitute the image display region 10a of the liquid crystal device according to the present embodiment of the invention. The TFT 30 is electrically connected to the pixel electrode 9a so as to perform switching control on the pixel electrode 9a at the time of operation of the liquid crystal device. Each of data lines 6a to which image signals are supplied is electrically connected to the source of the TFT 30. Image signals S1, S2, ..., and Sn that are written on the data lines 6a may be supplied respectively in this order in a line sequential manner. Alternatively, an image signal may be supplied to each of a plurality of groups that consists of an adjacent bundle of the plurality of data lines 6a.

Each of scanning lines 11a is connected to the gate of the TFT 30. The liquid crystal device according to the present embodiment of the invention is configured to apply, at a predetermined timing and in a pulse pattern, scanning signals G1, G2, ..., and Gm to the scanning lines 11a in this order in a line sequential manner. Each of the pixel electrodes 9a is electrically connected to the drain of the TFT 30. When the switch of the TFT 30, which functions as a switching element, is closed for a certain time period, the image signal S1, S2, ..., or Sn that is supplied through the data line 6a is written at a predetermined timing. After being written into liquid crystal, which is an example of electro-optical material, via the pixel electrodes 9a, the image signals S1, S2, ..., and Sn having a predetermined level are held for a certain time period between the pixel electrode 9a and the counter electrode 21 that is formed on the counter substrate 20 (refer to FIG. 2).

Since liquid crystal that constitutes the liquid crystal layer 50 (refer to FIG. 2) changes its orientation and/or order of molecular association depending on the level of a voltage being applied, it modulates light to realize a gradation display. Under a "normally-white" mode, the optical transmittance (i.e., light transmission factor) with respect to an incident light beam decreases in accordance with a voltage applied on a pixel-by-pixel basis (i.e., to each pixel), whereas, under a "normally-black" mode, the optical transmittance with respect to an incident light beam increases in accordance with a voltage applied on a pixel-by-pixel basis. Thus, when viewed as a whole, light having a certain contrast in accordance with an image signal is emitted from the liquid crystal device.

In order to prevent the leakage of the image signals being held, a storage capacitor 70 is added in electrically parallel with a liquid crystal capacitor that is formed between the pixel electrode 9a and the counter electrode 21 (refer to FIG. 2). The storage capacitor 70 is a capacitive element that functions as a hold capacitor (i.e., retention volume) for temporally holding the electric potential of each of the pixel electrodes 9a in accordance with the supply of an image signal. One electrode (specifically, an upper capacitor electrode 71, which will be described in detail later) of the storage capacitor 70 is connected to the drain of the TFT 30 in electrically parallel connection with the pixel electrode 9a, whereas the other electrode (specifically, a lower capacitor electrode 300a, which will also be described in detail later) thereof is connected to a capacitor line 300 with a fixed electric potential so as to provide a constant electric potential (i.e., "potentio-static"). According to such a storage capacitor 70, the electric potential retention property at the pixel electrode 9a is improved, making it possible to improve display characteristics, which could be perceived as an enhanced contrast and/or reduced flickers.

As described later, it should be noted that the storage capacitor 70 functions also as a built-in light-shielding film that shuts off light entering toward the TFT 30. Each of the plurality of capacitor lines 300 is arrayed to extend in parallel with (the corresponding one of) the plurality of data lines 6a, or in other words, along the Y direction.

Next, with reference to FIGS. 4 and 5, the specific configuration of the pixel unit that realizes the operation described above is explained below.

Figure 4:
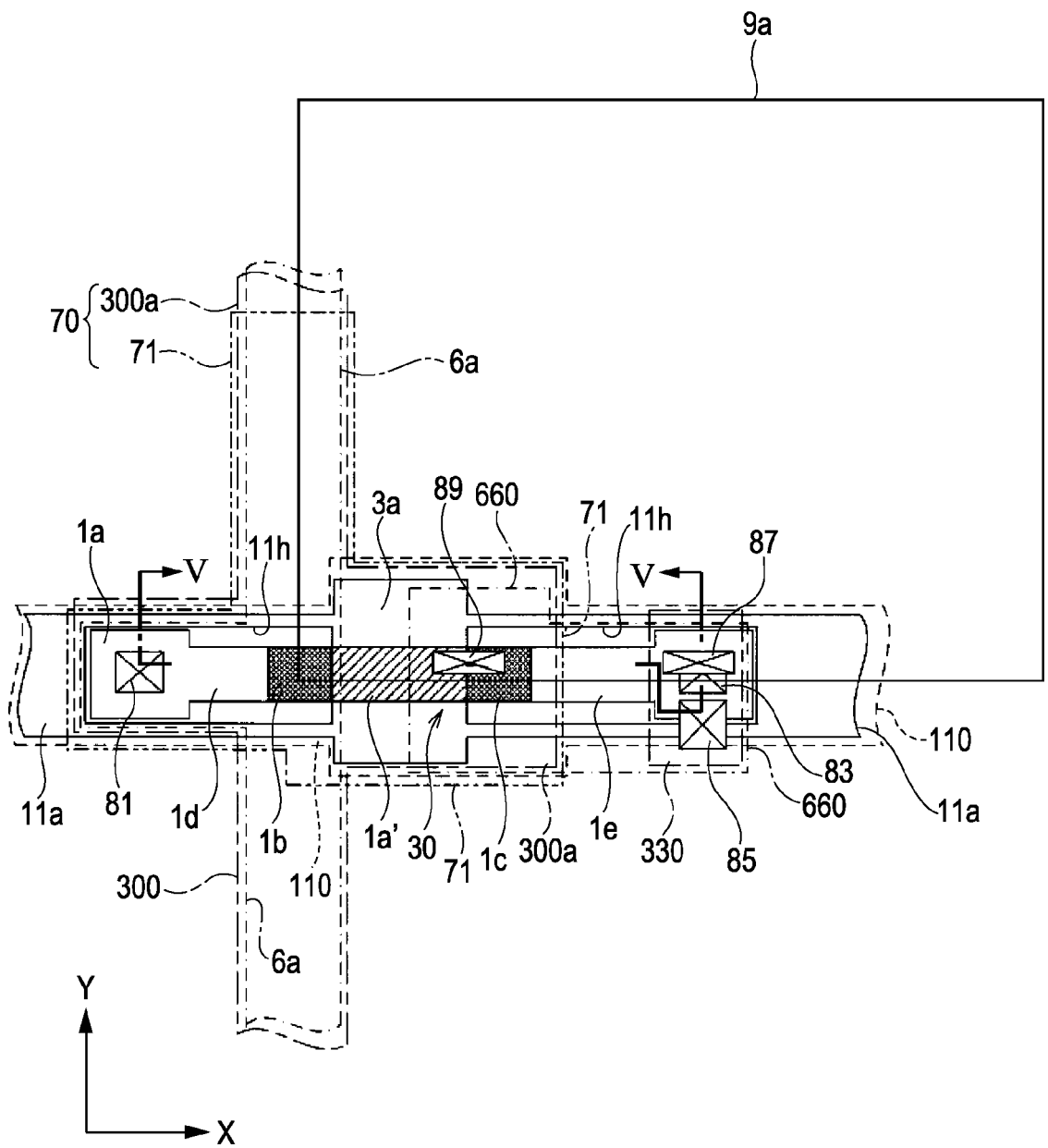
FIG. 4 is a plan view that schematically illustrates the configuration of a pixel unit according to an exemplary embodiment of the invention.

FIG. 4 is a plan view that schematically illustrates the configuration of a pixel unit according to the present embodiment of the invention. FIG. 5 is a sectional view taken along the line V-V of FIG. 4. In referring to FIGS. 4 and 5, it should be noted that different scales are used for layers/members so that each of the layers/members has a size that is easily recognizable in each of these drawings. It should be noted that, in the following explanation made while making reference to FIGS. 4 and 5, layers/members (i.e., constituent elements) provided on the TFT array substrate 10 only are described among all layers/members that are described above while making reference to FIGS. 1 and 2, which means that layers/members provided on the counter substrate 20 are omitted from the following description. In addition, for convenience of explanation, in FIGS. 4 and 5, layer portions deposited above/over the pixel electrodes 9a are omitted from these drawings.

FIG. 4 illustrates an enlarged view of a single pixel unit and its constituent/peripheral elements among a plurality of pixel units that are arrayed in the image display region 10a.

Figure 5:
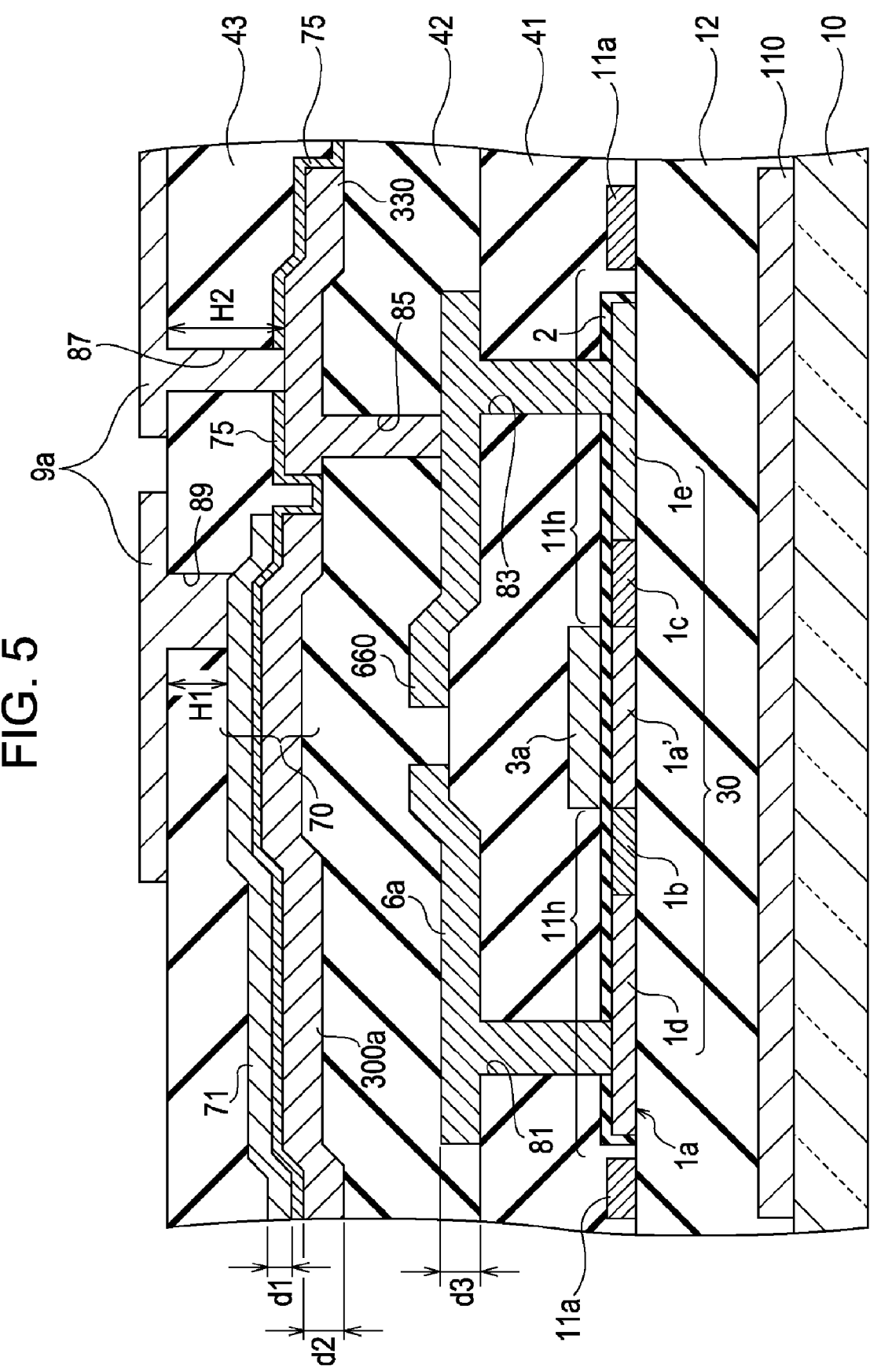
FIG. 5 is a sectional view taken along the line V-V of FIG. 4.

In the layer structure illustrated in FIG. 5, a layer portion from the TFT array substrate 10 inclusive to the pixel electrode 9a inclusive constitutes an example of "a circuit board for an electro-optical device" according to the invention.

Referring to FIG. 4, major constituent elements that are provided for driving the pixel electrode 9a are provided in a "non-open region" over the TFT array substrate 10. Specifically, major wiring constituent elements such as the scanning line 11a, the data line 6a, and the like as well as major circuit-device constituent elements such as the storage capacitor 70, the TFT 30, and the like are arranged inside the non-open region over the TFT array substrate 10 that surrounds an "open region" or "aperture region" of each pixel corresponding to the pixel electrode 9a. Herein, the term "open region" or "aperture region" means a region in each pixel that transmits or reflects light. Therefore, the open region, or in other words, the aperture region actually contributes to image display. On the other hand, the term "non-open region" means a region that blocks and shuts off light. Therefore, the non-open region does not actually contribute to image display. In particular, FIG. 4 illustrates the relative layout of, that is, positional relationship between, the pixel electrode 9a and the above-mentioned major wiring constituent elements such as the scanning line 11a, the data line 6a, and the like as well as the above-mentioned major circuit-device constituent elements such as the storage capacitor 70, the TFT 30, and the like that are arranged inside the non-open region.

As illustrated in FIG. 4, the data line 6a is provided in such a manner that it extends along the longitudinal edge, that is, vertical boundary, of the pixel electrode 9a, whereas the scanning line 11a is provided in such a manner that it extends along the latitudinal edge, that is, horizontal boundary, of the pixel electrode 9a. That is, the data line 6a extends in the Y direction as illustrated in FIG. 4. On the other hand, the scanning line 11a extends in the X direction so as to intersect with the data line 6a extending in the Y direction as illustrated in FIG. 4. The pixel electrode 9a is made of a transparent electro-conductive film such as an ITO film or the like. The plurality of pixel electrode 9a is arrayed in a matrix pattern over the TFT array substrate 10.

The pixel-switching TFT 30 is provided at a position corresponding to each intersection where the data line 6a and the scanning line 11 traverse each other. The pixel-switching TFT 30 has a channel region 1a' that is formed at a region opposed to a gate electrode 3a. The gate electrode 3a and the scanning line 11a are formed as a single pattern.

As illustrated in FIG. 5, various kinds of constituent elements such as wirings and circuit devices/elements, including but not limited to the pixel electrode 9a described above, are formed over the TFT array substrate 10 to make up a lamination structure. These various kinds of constituent elements formed in the lamination structure include a first layer in which a lower light-shielding film 110 is formed, which is the undermost layer, a second layer in which the TFT 30 and the like are formed, a third layer in which the data line 6a and the like are formed, a fourth layer in which the storage capacitor 70 and the like are formed, and a fifth layer in which the pixel electrode 9a and the like are formed, which is the uppermost layer. That is, as illustrated in the drawing, the first layer, the second layer, the third layer, the fourth layer, and the fifth layer are deposited in the order of appearance herein. An underlying insulation film 12, that is, a ground insulator film, is formed between the first layer and the second layer. A first inter-bedded insulation film 41 is formed between the second layer and the third layer. A second inter-bedded insulation film 42 is formed between the third layer and the fourth layer. A third inter-bedded insulation film 43 is formed between the fourth layer and the fifth layer. These inter-bedded insulation films 41, 42, and 43 as well as the underlying insulation film 12 prevent the occurrence of a short-circuit failure among these various kinds of constituent elements.

In the following description, a detailed explanation of these component layers that make up the lamination structure is given. First of all, the layer structure of the undermost first layer is explained below.

Structure of First Layer—Lower Light-Shielding Film

The lower light-shielding film 110 is deposited in the first layer.

The lower light-shielding film 110 is formed at a layer under the semiconductor layer 1a with the underlying insulation film 12 being interposed therebetween. The lower light-shielding film 110 is made of, for example, an electro-conductive material having light-shielding property such as a high melting point metal material and the like. A couple of examples of such a high melting point metal material, without any limitation thereto, include tungsten (W), titanium (Ti), and titanium nitride (TiN). As illustrated in FIG. 4, the lower light-shielding film 110 is formed in such a manner that it extends along a direction in which the scanning line 11a extends, that is, along the X direction. Specifically, the lower light-shielding film 110 is formed in a stripe pattern in the image display region 10a so as to cover a region corresponding to the scanning line 11a. Having such a configuration, the lower light-shielding film 110 makes it possible to shut off light (return light) that propagates toward the TFT 30 from the TFT array substrate (10) side. For example, thanks to the presence of the lower light-shielding film 110, it is possible to shut off, though not limited thereto, light due to backside reflection at the TFT array substrate 10, or light that is emitted from other liquid crystal device by means of a multiple-plate type projector, or the like, to penetrate through a composite optical system, thereby effectively protecting the TFT 30.

Structure of Second Layer—Scanning Line, TFT, and Other Layer Constituent Elements The scanning line 11a and the TFT 30 are formed in the second layer.

As illustrated in FIGS. 4 and 5, the TFT 30 has the semiconductor layer 1a and the gate electrode 3a.

The semiconductor layer 1a is made of, for example, poly-silicon. As illustrated in FIG. 4, the semiconductor layer 1a is formed in such a manner that it extends along a direction in which the scanning line 11a extends, that is, along the X direction. Specifically, the semiconductor layer 1a consists of a channel region 1a', which has a channel length along the X direction, a data-line-side source/drain region 1d, a data-line-side LDD region 1b, a pixel-electrode-side LDD region 1c, and a pixel-electrode-side source/drain region 1e, where the above-mentioned data-line-side source/drain region 1d, the data-line-side LDD region 1b, the channel region 1a', the pixel-electrode-side LDD region 1c, and the pixel-electrode-side source/drain region 1e are arrayed/aligned along the X direction. The data-line-side source/drain region 1d and the pixel-electrode-side source/drain region 1e are formed approximately in a mirror symmetry pattern along the X direction with respect to the channel region 1a'. The data-line-side LDD region 1b is formed between the channel region 1a' and the data-line-side source/drain region 1d. The pixel-electrode-side LDD region 1c is formed between the channel region 1a' and the pixel-electrode-side source/drain region 1e. The data-line-side LDD region 1b, the pixel-electrode-side LDD region 1c, the data-line-side source/drain region 1d, and the pixel-electrode-side source/drain region 1e are impurity regions (impurity ranges) that are formed by implanting impurities into the semiconductor layer 1a by using, for example, an ion implantation method, or other alternative method. The data-line-side LDD region 1b and the pixel-electrode-side LDD region 1c are deposited as lightly doped (low concentration) impurity regions having less impurities than the data-line-side source/drain region 1d and the pixel-electrode-side source/drain region 1e, respectively. According to such an impurity region, it is possible to reduce the amount of an OFF-state current that flows in the source region and the drain region during the non-operating time of the TFT 30, and also to suppress the decrease of an ON-state current that flows during the operating time of the TFT 30.

It should be noted that, although it is preferable that the TFT 30 has an LDD structure, it might be configured to have an offset structure in which the implantation of impurities is not performed on the data-line-side LDD region 1b and the pixel-electrode-side LDD region 1c. As another alternative example, it may be configured that impurities are heavily doped while using the gate electrode as a mask (i.e., high concentration) so as to deposit the data-line-side source/drain region and the pixel-electrode-side source/drain region, which may be referred to as a self-aligned structure. The semiconductor layer 1a may be configured as either a mono-crystalline layer or a poly-crystalline layer. A known method such as "a lamination pasting method" may be used for the formation of a mono-crystalline layer. If the semiconductor layer 1a is configured as a mono-crystalline layer, in particular, it is possible to enhance the performance of peripheral circuits.

As illustrated in FIG. 3, the gate electrode 3a is deposited as a part of the scanning line 11a. The scanning line 11a is made of, for example, conductive polysilicon. The scanning line 11a (gate electrode 3a) is formed at a layer over the semiconductor layer 1a with an insulation film 2 being interposed therebetween. The scanning line 11a is formed in such a manner that it extends along the X direction. In addition, the scanning line 11a is formed in a stripe pattern in the image display region 10a. The gate electrode 3a is configured as a portion of the scanning line 11a that overlaps, in a plan view, (i.e., overlies, but not immediately on it as illustrated in the drawing) the channel region 1a' of the semiconductor layer 1a. As illustrated in FIGS. 4 and 5, the scanning line 11a has holes 11h each of which is formed at a region that does not overlap but adjoins the channel region 1a' of the semiconductor layer 1a in a plan view. An inter-space region that overlaps the channel region 1a' of the semiconductor layer 1a in a plan view, which lies between these holes 11h, is formed as the gate electrode 3a.

The underlying insulation film 12 provides inter-bedded insulation between the first layer and the second layer, which means that the first layer and the second layer are insulated from each other with the underlying insulation film 12 being sandwiched therebetween. The underlying insulation film 12 is made of a silicon oxide film, though not limited thereto. The underlying insulation film 12, which is formed over the entire surface of the TFT array substrate 10, has a function of preventing any degradation in the characteristics and/or performance of the pixel-switching TFT 30 that is attributable to the surface roughness of the TFT array substrate 10 caused at the time of surface polishing thereof or attributable to any stains that remain without being removed completely after washing thereof, though not limited thereto.

Structure of Third Layer—Data Line

The data line 6a and a first relay electrode 660 are formed in the third layer.

The data line 6a is made of at least one metal film containing at least one metal material such as aluminum (Al). The metal film may be made up of a plurality of film layers containing an aluminum layer. Alternatively, the metal film may be made up of a single aluminum layer. The data line 6a is electrically connected to the data-line-side source/drain region 1d of the TFT 30 via a contact hole 81 that is formed to penetrate through the first inter-bedded insulation film 41.

The first relay electrode 660 is an example of "a second relay electrode" according to the invention. The first relay electrode 660 is electrically connected to the pixel-electrode-side source/drain region 1e of the TFT 30 via a contact hole 83 that is formed to penetrate through the first inter-bedded insulation film 41. The first relay electrode 660 functions in combination with a second relay electrode 330 and the pixel electrode 9a to relay, that is, electrically connect, the upper capacitor electrode 71 of the storage capacitor 70 and the TFT 30. A more detailed explanation will be given of the second relay electrode 330 later.

The first relay electrode 660 is made of the same film as that of the data line 6a. As illustrated in FIG. 4, the first relay electrode 660 is formed over the TFT array substrate 10 to have a planar pattern that does not adjoin the data line 6a when viewed in two dimensions. In other words, the first relay electrode 660 is isolated from the data line 6a in the sense of an electric pattern in a plan view. With such an isolation pattern, the first relay electrode 660 and the data line 6a are electrically insulated from each other with the second inter-bedded insulation film 42 being interposed therebetween, although the first relay electrode 660 is formed in the same layer as that of the data line 6a. Since the first relay electrode 660 is made of the same film as that of the data line 6a, in comparison with a case where the first relay electrode 660 is made of one material and the data line 6a is made of another material that is not the same as the above-mentioned one material, the above-described configuration makes it possible to simplify the layer structure of each pixel. In addition, the configuration of a liquid crystal device according to the present embodiment of the invention makes it further possible to reduce the number of manufacturing steps, which results in simplified production.

The first inter-bedded insulation film 41 provides inter-bedded insulation between the second layer and the third layer. The first inter-bedded insulation film 41 is made of, for example, non-silicate glass (NSG). The material of the first inter-bedded insulation film 41 is not limited to the non-silicate glass. For example, the first inter-bedded insulation film 41 may be made of other kinds of silicate glasses such as phosphorus silicate glass (PSG), boron silicate glass (BSG), and boron phosphorus silicate glass (BPSG). As another non-limiting example, the first inter-bedded insulation film 41 may be made of silicon nitride, silicon oxide, or the like.

Structure of Fourth Layer—Storage Capacitor

The storage capacitor 70 and the second relay electrode 330 are formed in the fourth layer.

The storage capacitor 70 is made up of the lower capacitor electrode 300a, the upper capacitor electrode 71, and a dielectric film 75. The lower capacitor electrode 300a and the upper capacitor electrode 71 are opposed to each other with the dielectric film 75 being sandwiched therebetween. The lower capacitor electrode 300a of the storage capacitor 70 functions as a fixed-electric-potential-side capacitor electrode. The lower capacitor electrode 300a and the capacitor line 300 are formed as a single pattern. On the other hand, the upper capacitor electrode 71 of the storage capacitor 70 functions as a pixel-electric-potential-side capacitor electrode. The upper capacitor electrode 71 is electrically connected to the pixel electrode 9a and further to the pixel-electrode-side source/drain region 1e of the TFT 30.

As illustrated in FIG. 4, the lower capacitor electrode 300a of the storage capacitor 70 is configured as a part of the capacitor line 300 that is formed to extend in the Y direction. In other words, the capacitor line 300 is made of the same film as that of the lower capacitor electrode 300a so as to constitute a single pattern.

The dielectric film 75 is made of a relatively thin silicon nitride (SiN) film having the film thickness of, for example, 5-300 nm. In order to increase the capacitance, that is, electric capacity, of the storage capacitor 70, it is preferable to make the film thickness of the dielectric film 75 smaller as much as possible without sacrificing the reliability of the film.

The upper capacitor electrode 71 of the storage capacitor 70 is electrically connected to the pixel electrode 9a via a contact hole 89 that is formed to penetrate through the third inter-bedded insulation film 43. The contact hole 89 is an example of "a first contact hole" according to the invention.

The storage capacitor 70 has a so-called MIM structure. That is, each of the upper capacitor electrode 71 and the lower capacitor electrode 300a is made of a (at least one) metal film containing a (at least one) metal material such as aluminum (Al). Therefore, in comparison with a case where each of the upper capacitor electrode 71 and the lower capacitor electrode 300a is made of, for example, an electro-conductive material containing polysilicon, the above-described configuration makes it possible to reduce an electric resistance for each of the upper capacitor electrode 71 and the lower capacitor electrode 300a. In addition, the above-described configuration makes it possible to form the dielectric film 75 by means of a dielectric material having a high dielectric constant, that is, a "High-k" material. Therefore, it is possible to ensure a large electric capacity of the storage capacitor 70.

In the configuration of a liquid crystal device according to the present embodiment of the invention, as has already been described above, the capacitor line 300 is made of the same film as that of the lower capacitor electrode 300a, where the capacitor line 300 and the lower capacitor electrode 300a constitute a single pattern. With such a configuration, it is possible to reduce an electric resistance and to stabilize both the electric potential of the capacitor line 300 and the electric potential of the lower capacitor electrode 300a. As illustrated in FIG. 4, the capacitor line 300 is formed in such a manner that it extends along a direction in which the data line 6a extends, that is, along the Y direction. Specifically, in a plan view, the capacitor line 300 is formed in a stripe pattern in the image display region 10a at a region corresponding to the data line 6a. Preferably, the capacitor line 300 extends from the image display region 10a, at which the pixel electrodes 9a are provided, to the periphery thereof. The capacitor line 300 is electrically connected to a constant electric potential source and is maintained at a constant electric potential. A detailed configuration of the capacitor line 300 is not illustrated in the drawing. The constant electric potential source may be configured as a constant electric potential source such as a positive supply or a negative supply that is supplied to the data line driving circuit 101. Alternatively, the constant electric potential source may be configured as a counter electrode electric potential that is supplied to the counter electrode 21 of the counter substrate 20.

Therefore, the capacitor line 300 occupies a relatively large pattern area over the TFT array substrate 10, which is equivalent to the pattern area of the data line 6a formed over the TFT array substrate 10. Therefore, it is possible to ensure a large electric capacity of the storage capacitor 70. In addition, in the configuration of a liquid crystal device according to the present embodiment of the invention, although the pattern area of the capacitor line 300 formed over the TFT array substrate 10 is relatively large, it is possible to reduce an electric resistance thereof because the capacitor line 300 is made of the same film as that of the lower capacitor electrode 300a so as to constitute a single pattern. In addition, since the capacitor line 300 is made of the same film as that of the lower capacitor electrode 300a so as to constitute a single pattern, in comparison with a case where the capacitor line 300 is made of one material and the lower capacitor electrode 300a is made of another material that is not the same as the above-mentioned one material, the above-described configuration makes it possible to simplify the layer structure of each pixel. In addition, the configuration of a liquid crystal device according to the present embodiment of the invention makes it further possible to reduce the number of manufacturing steps, which results in simplified production.

The second relay electrode 330 is an example of "a second relay electrode" or "one relay electrode" according to the invention. The second relay electrode 330 is made of the same film as that of the lower capacitor electrode 300a, that is, a metal film. Since the second relay electrode 330 is made of the same film as that of the lower capacitor electrode 300a, in comparison with a case where the second relay electrode 330 is made of one material and the lower capacitor electrode 300a is made of another material that is not the same as the above-mentioned one material, the above-described configuration makes it possible to simplify the layer structure of each pixel. In addition, it is also possible to reduce the number of manufacturing steps, thereby making it possible to simplify the production of the liquid crystal device according to the present embodiment of the invention.

The second relay electrode 330 is electrically connected to the first relay electrode 660 via a contact hole 85 that is formed to penetrate through the second inter-bedded insulation film 42. In addition, the second relay electrode 330 is electrically connected to the pixel electrode 9a via a contact hole 87 that is formed to penetrate through the third inter-bedded insulation film 43. The contact hole 87 is an example of "a second contact hole" according to the invention.

The second inter-bedded insulation film 42 provides inter-bedded insulation between the third layer and the fourth layer. The second inter-bedded insulation film 42 is made of, for example, NSG. The material of the second inter-bedded insulation film 42 is not limited to NSG. For example, the second inter-bedded insulation film 42 may be made of other kinds of silicate glasses such as PSG, BSG, and BPSG. As another non-limiting example, the second inter-bedded insulation film 42 may be made of silicon nitride, silicon oxide, or the like.

Structure of Fifth Layer—Pixel Electrode

The pixel electrode 9a is formed in the fifth layer.

The pixel electrode 9a is provided in each of the plurality of pixels that are demarcated from, and arrayed adjacent to, one another in a matrix pattern having a plurality of rows and a plurality of columns. The data lines 6a and the scanning lines 11a are arrayed to form a grid pattern in a plan view, where the data line 6a and the scanning line 11a extend at the boundary between each two adjacent ones of the plurality of pixels. The pixel electrode 9a is made of a transparent electro-conductive film such as an ITO film or the like. The pixel electrode 9a is electrically connected to the upper capacitor electrode 71 of the storage capacitor 70 via the contact hole 89 that is formed to penetrate through the third inter-bedded insulation film 43.

The third inter-bedded insulation film 43 provides inter-bedded insulation between the fourth layer and the fifth layer. The third inter-bedded insulation film 43 is made of, for example, NSG. The material of the third inter-bedded insulation film 43 is not limited to NSG. For example, the third inter-bedded insulation film 43 may be made of other kinds of silicate glasses such as PSG, BSG, and BPSG. As another non-limiting example, the third inter-bedded insulation film 43 may be made of silicon nitride, silicon oxide, or the like. The surface of the third inter-bedded insulation film 43 is subjected to planarization processing (i.e., smoothing treatment) by means of a chemical mechanical polishing (CMP).

In the configuration of a liquid crystal device according to the present embodiment of the invention, the pixel electrode 9a functions as a relay electrode (or, in other words, a relay layer) that establishes, in combination with the first relay electrode 660 and the second relay electrode 330, an electric connection between the TFT 30 and the storage capacitor 70. That is, the pixel electrode 9a, the first relay electrode 660, and the second relay electrode 330 co-function to relay, that is, electrically connect, the TFT 30 and the upper capacitor electrode 71 of the storage capacitor 70, which serves as the pixel-electric-potential-side capacitor electrode. This means that, in the configuration of a liquid crystal device illustrated in the drawing, the pixel electrode 9a has double functions and also serves as a relay electrode in addition to its usual function of a pixel electrode that retains a pixel electric potential.

As has already been described above, the pixel electrode 9a is electrically connected, at one end, to the upper capacitor electrode 71 of the storage capacitor 70 via the contact hole 89 that is formed to penetrate through the third inter-bedded insulation film 43. At the other end, the pixel electrode 9a is electrically connected to the second relay electrode 330 via the contact hole 87 that is also formed to penetrate through the third inter-bedded insulation film 43. With such a configuration, the upper capacitor electrode 71 of the storage capacitor 70 is electrically connected to the pixel electrode 9a via the contact hole 89 that is formed to penetrate through the third inter-bedded insulation film 43, where the pixel electrode 9a is electrically connected to the second relay electrode 330 via the contact hole 87 that is also formed to penetrate through the third inter-bedded insulation film 43. The second relay electrode 330 is electrically connected to the first relay electrode 660 via the contact hole 85 that is formed to penetrate through the second inter-bedded insulation film 42. The first relay electrode 660 is electrically connected to the pixel-electrode-side source/drain region 1e of the TFT 30 via the contact hole 83 that is formed to penetrate through the first inter-bedded insulation film 41. To sum up, through the electric relay configuration described above, the upper capacitor electrode 71 of the storage capacitor 70 is electrically connected to the pixel-electrode-side source/drain region 1e of the TFT 30.

When manufacturing a liquid crystal device according to the present embodiment of the invention, the contact hole 89 that provides an electric connection between the upper capacitor electrode 71 of the storage capacitor 70 and the pixel electrode 9a is bored to penetrate through the third inter-bedded insulation film 43 after the formation of the upper capacitor electrode 71. That is, the contact hole 89 is formed to go through the third inter-bedded insulation film 43, which is deposited at a layer over the upper capacitor electrode 71, after the formation of the storage capacitor 70. In addition, the contact hole 87 that provides an electric connection between the pixel electrode 9a and the second relay electrode 330 is also bored to penetrate through the third inter-bedded insulation film 43 (and further through the dielectric film 75) after the formation of the storage capacitor 70. That is, it is possible to form the contact hole 87 that penetrates through the third inter-bedded insulation film 43 and the dielectric film 75 concurrently with the formation of the contact hole 89, that is, in the same (i.e., single) contact-hole-formation step as that of the contact hole 89.

Therefore, in the manufacturing process of a liquid crystal device according to the present embodiment of the invention, it is not necessary to form any contact hole that penetrates through the dielectric film 75 for the purpose of electrically connecting the upper capacitor electrode 71 to the TFT 30 that is provided at a layer under (or below) the upper capacitor electrode 71 through the contact hole bored through the dielectric film 75. This means that the above-described "bypass" configuration of the liquid crystal device according to the present embodiment of the invention eliminates the need for applying a resist to the surface of the dielectric film 75 and then removing the resist from the surface of the dielectric film 75. Thus, it is possible to avoid the surface of the dielectric film 75 from becoming polluted or eroded away due to the application of a resist thereto and the removal of the resist therefrom. That is, it is possible to increase the precision in the surface control of the dielectric film 75 in the production of a liquid crystal device according to the present embodiment of the invention. Or, in other words, it is possible to prevent any degradation in the quality of the dielectric film 75 after formation thereof. Therefore, it is possible to effectively reduce the risk of, or completely prevent, the occurrence of an operation failure of the storage capacitor 70, including but not limited to, the generation of a leakage current due to a decrease in the withstanding pressure of the dielectric film 75. Thus, a liquid crystal device according to the present embodiment of the invention makes it possible to display a high-quality image with enhanced reliability.

As a modified configuration of a liquid crystal device according to the exemplary embodiment of the invention described above, a third relay electrode that is not the same (i.e., single) electrode as the pixel electrode 9a may be provided at a layer over the upper capacitor electrode 71 of the storage capacitor 70. In such a modified configuration, the third relay electrode provides an electric connection between the upper capacitor electrode 71 and the second relay electrode 330; and in addition thereto, the third relay electrode further provides an electric connection between the upper capacitor electrode 71 and the pixel electrode 9a. Although such a modified configuration is practicable, the configuration of a liquid crystal device according to the foregoing exemplary embodiment of the invention has the following advantage in comparison with the modified configuration described above. That is, in the configuration of a liquid crystal device according to the foregoing exemplary embodiment of the invention, since the pixel electrode 9a has double functions and also serves as a relay electrode in addition to its usual function of a pixel electrode, which eliminates the need for providing such a third relay electrode at a layer over the upper capacitor electrode 71 of the storage capacitor 70, it is possible to simplify the lamination structure of each pixel and/or the layout of various kinds of constituent elements formed in the lamination structure. In addition, the configuration of a liquid crystal device according to the foregoing exemplary embodiment of the invention makes it further possible to simplify the manufacturing process thereof.

In the configuration of a liquid crystal device according to the present embodiment of the invention, three metal film layers that constitute the data line 6a, the upper capacitor electrode 71, and the lower capacitor electrode 300a are deposited in the third layer and the fourth layer. Specifically, a metal film layer that constitutes the data line 6a is deposited on the third layer. Another metal film layer that constitutes the upper capacitor electrode 71 and still another metal film layer that constitutes the lower capacitor electrode 300a are deposited on the fourth layer. The metal film layer that constitutes the data line 6a and the metal film layer that constitutes the lower capacitor electrode 300a are electrically insulated from each other with the second inter-bedded insulation film 42 being sandwiched therebetween. The metal film layer that constitutes the lower capacitor electrode 300a and the metal film layer that constitutes the upper capacitor electrode 71 are also electrically insulated from each other with the dielectric film 75 being sandwiched therebetween. Since these three layers of metal films are deposited over the TFT 30 provided on the TFT array substrate 10, it is possible to shut off any incident light coming through upper layers that are deposited above these three metal film layers with an increased reliability. Therefore, these three light-shielding metal film layers effectively reduce the generation of an optical leakage current at the TFT 30.

In the configuration of a liquid crystal device according to the present embodiment of the invention, the first relay electrode 660 is made of the same film as that of the data line 6a. Accordingly, the first relay electrode 660 is formed in the same layer as that of the data line 6a. In addition, the second relay electrode 330 is made of the same film as that of the lower capacitor electrode 300a. Accordingly, the second relay electrode 330 is formed in the same layer as that of the lower capacitor electrode 300a. With such a configuration, it is possible to avoid the electric resistance of an entire relay path, which electrically connects the upper capacitor electrode 71 of the storage capacitor 70 and the TFT 30, from being increased because of the electric resistances of the first relay electrode 660 and the second relay electrode 330.

As illustrated in FIG. 5, in the configuration of a liquid crystal device according to the present embodiment of the invention, the storage capacitor 70 is formed at a layer above the data line 6a. Therefore, it is possible to ensure a relatively large electric capacity of the storage capacitor 70. In addition, it is further possible to stabilize the electric potential of the pixel electrode 9a.

If the data line 6a is formed at a layer above the storage capacitor 70, which is not the case for the configuration of a liquid crystal device according to the present embodiment of the invention, it is necessary to determine the formation region of the storage capacitor 70 so that the storage capacitor 70 does not overlap the contact hole 81, which is formed to provide an electric connection between the data line 6a and the TFT 30, in a plan view. This means that an area where the storage capacitor 70 can be formed is limited. In contrast, in the configuration of a liquid crystal device according to the present embodiment of the invention, the storage capacitor 70 is formed at a layer above the data line 6a. Therefore, as illustrated in FIG. 4, it is possible to form the storage capacitor 70 at a region that overlaps the contact hole 81, which provides an electric connection between the data line 6a and the TFT 30, in a plan view. Therefore, the configuration of a liquid crystal device according to the present embodiment of the invention makes it possible to allocate a relatively large area for the formation of the storage capacitor 70 over the TFT array substrate 10. By this means, it is possible to ensure a relatively large electric capacity value of the storage capacitor 70.

In the pixel lamination structure of the liquid crystal device according to the present embodiment of the invention, the storage capacitor 70 is formed at a layer between the pixel electrode 9a and the data line 6a. When attention is focused on the lamination structure of the storage capacitor 70 and the data line 6a, it can be said that the lower capacitor electrode 300a is interposed between the data line 6a and the upper capacitor electrode 71. Therefore, the configuration of a liquid crystal device according to the present embodiment of the invention ensures that neither the pixel electrode 9a nor the upper capacitor electrode 71 is formed in the proximity of the data line 6a. In addition, since the lower capacitor electrode 300a is provided between the data line 6a and the pixel electrode 9a/upper capacitor electrode 71 in the configuration of a liquid crystal device according to the present embodiment of the invention, in comparison with a case where the lower capacitor electrode 300a is not provided therebetween, it is possible to effectively shield the electromagnetic interference of the data line 6a. Thus, it is possible to prevent the electromagnetic interference of the data line 6a from causing a fluctuation/variation in the electric potential of each of the pixel electrode 9a or the upper capacitor electrode 71. Or, even if it occurs slightly, it is possible to, at least, minimize the fluctuation/variation in the electric potential thereof to a satisfactory level where no visually perceivable display problem arises.

As illustrated in FIG. 5, in the configuration of a liquid crystal device according to the present embodiment of the invention, the film thickness d1 of the metal film that constitutes the upper capacitor electrode 71 is configured to be smaller than both the film thickness d2 of the metal film that constitutes the lower capacitor electrode 300a and the film thickness d3 of the metal film that constitutes the data line 6a (i.e., d1<d2, d1<d3).

With such a configuration, it is possible to easily form the contact hole 89 and the contact hole 87 in the same single contact-hole-formation step. Specifically, when the contact hole 89 and the contact hole 87 are concurrently formed in the same single contact-hole-formation step, even if the inter-bedded distance (i.e., layer-to-layer distance) H2 between the pixel electrode 9a and the second relay electrode 330 is larger than the inter-bedded distance H1 between the pixel electrode 9a and the upper capacitor electrode 71 by an aggregate film thickness that is the sum of the film thickness d1 of the upper capacitor electrode 71 and the film thickness of the dielectric film 75, it is still possible to prevent the formed contact hole 89 from exceeding a desired depth and thus penetrating through or into the upper capacitor electrode 71 while forming the contact hole 87, which provides an electric connection between the pixel electrode 9a and the second relay electrode 330, at a desired depth because the film thickness d1 of the upper capacitor electrode 71 is configured to be smaller than both the film thickness d2 of the lower capacitor electrode 300a and the film thickness d3 of the data line 6a. In other words, in the configuration of a liquid crystal device according to the present embodiment of the invention, since the film thickness d1 of the upper capacitor electrode 71 is configured to be smaller than both the film thickness d2 of the lower capacitor electrode 300a and the film thickness d3 of the data line 6a, the difference between the depth of the contact hole 89, which is equivalent to the inter-bedded distance H1, and the depth of the contact hole 87, which is equivalent to the inter-bedded distance H2, is relatively small. Because the difference between the depth H1 of the contact hole 89 and the depth H2 of the contact hole 87 is configured to be relatively small, it is possible to easily form the contact hole 89 and the contact hole 87, which differ from each other in terms of depth, in the same single contact-hole-formation step. Therefore, the configuration of a liquid crystal device according to the present embodiment of the invention achieves simplified manufacturing process.

As illustrated in FIG. 4, since the upper capacitor electrode 71 is provided on a pixel-by-pixel basis, in comparison with the pattern area of the data line 6a provided as a common line that is shared among a plurality of pixels arrayed in a line along the Y direction, the pattern area of the upper capacitor electrode 71 over the TFT array substrate 10 is relatively small. In addition, on the condition that the lower capacitor electrode 300a and the capacitor line 300 are formed as a single pattern, the pattern area of the upper capacitor electrode 71 is relatively small in comparison with the pattern area of the capacitor line 300. Therefore, even though the film thickness d1 of the upper capacitor electrode 71 is configured to be relatively small, it is still possible to maintain the electric resistance thereof at a relatively low resistance level in comparison with the electric resistance of the data line 6a or the electric resistance of the capacitor line 300.

As explained above, with the configuration of a liquid crystal device according to the present embodiment of the invention, it is possible to improve the quality of the dielectric film 75 that constitutes a part of the storage capacitor 70. Therefore, it is possible to effectively reduce the risk of, or completely prevent, the occurrence of an operation failure of the storage capacitor 70. Thus, a liquid crystal device according to the present embodiment of the invention makes it possible to display a high-quality image in the image display region 10a with enhanced reliability.

Electronic Apparatus

Figure 6:
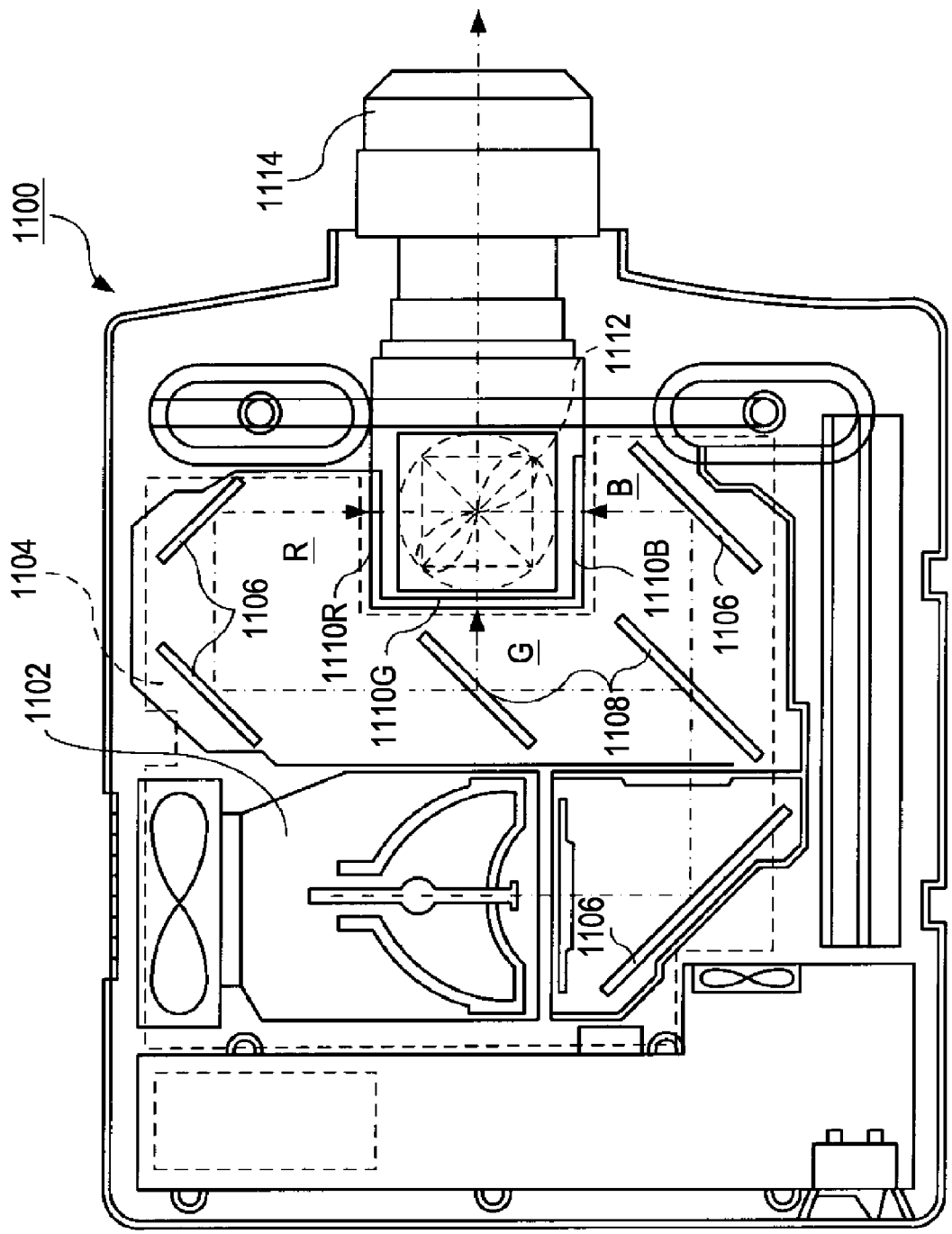
FIG. 6 is a plan view that schematically illustrates an example of the configuration of a projector, which is an example of electronic apparatuses to which an electro-optical device according to the invention is applied.

Next, an explanation is given on the application of the above-described liquid crystal device, which is an example of an electro-optical device, to various kinds of electronic apparatuses. FIG. 6 is a plan view that schematically illustrates an example of the configuration of a projector. In the following description, an explanation is given on a projector that employs the above-described liquid crystal device as a light valve.

As illustrated in FIG. 6, a lamp unit 1102, which is made of a white light source such as a halogen lamp, is provided in a projector 1100. A projection light that is emitted from the lamp unit 1102 is separated into three primary color components of R, G, and B by four mirrors 1106 and two dichroic mirrors 1108 arranged in a light guide 1104. The separated primary color components of R, G, and B enter liquid crystal panels 1110R, 1110B, and 1110G, respectively, which function as light valves corresponding to the respective primary color components.

The configuration of the liquid crystal panel 1110R, 1110G, or 1110B is the same as or similar to that of the liquid crystal device described above. Each of these liquid crystal panels 1110R, 1110G, and 1110B is driven by the corresponding one of the primary color signals R, G, and B, which are supplied from the image signal processing circuit. Light subjected to optical modulation by one of these liquid crystal panels enters a dichroic prism 1112 from the corresponding one of three directions. Light of R color component and light of B color component are refracted at a 90-degree angle at the dichroic prism 1112, whereas light of G color component goes straight through the dichroic prism 1112. Therefore, as a result of combination of these color components, a color image is projected on a screen, etc., through a projection lens 1114.

Focusing attention on a display image offered by each of the liquid crystal panels 1110R, 1110G, and 1110B, it is necessary to reverse the display image of the liquid crystal panel 1110G in a mirror pattern (that is, reverse the left side and the right side) with respect to the display images of the liquid crystal panels 1110R and 1110B.

Because light corresponding to each one of the primary colors R, G, and B enters into the corresponding one of the liquid crystal panel 1110R, 1110G, and 1110B thanks to the presence of the dichroic mirror 1108, it is not necessary to provide a color filter thereon.

Among a variety of electronic apparatuses to which the electro-optical device according to the invention could be embodied are, in addition to the electronic apparatus (projector) explained above with reference to FIG. 6, a mobile-type personal computer, a mobile phone, a liquid crystal display television, a viewfinder-type video recorder, a video recorder of a direct monitor view type, a car navigation device, a pager, an electronic personal organizer, an electronic calculator, a word processor, a workstation, a videophone, a POS terminal, a touch-panel device, and so forth. Needless to say, the invention is also applicable to these various electronic apparatuses without any limitation to those mentioned above.

In addition to the liquid crystal device explained in the exemplary embodiments described above, the invention is also applicable to a reflective liquid crystal display which has elements formed on a silicon substrate (LCOS, liquid crystal on silicon), a plasma display (PDP), a field emission display (FED), a surface-conduction electron-emitter display (SED), an organic EL display, a digital micro mirror device (DMD), an electrophoresis apparatus, to name a few.

The present invention should in no case be interpreted to be limited to the specific embodiments described above. The invention may be modified, altered, changed, adapted, and/or improved within a range not departing from the gist and/or spirit of the invention apprehended by a person skilled in the art from explicit and implicit description given herein as well as appended claims. A circuit board used for an electro-optical device that is subjected to such a modification, alteration, change, adaptation, and/or improvement, an electro-optical device having such a circuit board subjected thereto, and an electronic apparatus that is provided with such an electro-optical device, are also within the technical scope of the invention.

What is claimed is:
1. An electro-optical device comprising:
  a substrate;
  data lines disposed over the substrate and scanning lines disposed over the substrate, the data lines and the scanning lines intersecting with each other;
  pixels corresponding to intersections between the data lines and the scanning lines
  transistors disposed over the substrate at positions of the pixels;

a plurality of storage capacitors in a layer above the transistors each storage capacitor including;
- a fixed-electric-potential-side capacitor electrode located in a lower layer of the storage capacitor;
- a pixel-electric-potential-side capacitor electrode located in an upper layer of the storage capacitor; and
- a dielectric film sandwiched between the fixed-electric-potential-side capacitor electrode and the pixel-electric-potential-side capacitor electrode;

an interlayer insulation film in a layer above the pixel-electric-potential-side capacitor electrode, a first contact hole being formed through the interlayer insulation film; and pixel electrodes each disposed in a pixel and electrically connected to the pixel-electric-potential-side capacitor electrode, each pixel electrode including a first relay electrode formed in a layer above the pixel-electric-potential-side capacitor electrode with the interlayer insulation film sandwiched between the first relay electrode and the pixel-electric-potential-side capacitor electrode, the first relay electrode being electrically connected to the pixel-electric-potential-side capacitor electrode via the first contact hole so that an electric relay connection is provided between the pixel-electric-potential-side capacitor electrode and the transistor.

2. The electro-optical device according to claim 1, wherein the storage capacitor is formed at a layer above the data line.

3. The electro-optical device according to claim 2, further comprising a second relay electrode formed from an electro-conductive film located in the same layer as at least one of the fixed-electric-potential-side capacitor electrode and the data line, the second relay electrode providing an electric relay connection between the first relay electrode and the transistor.

4. The electro-optical device according to claim 3, the second relay electrode being located in the same layer as the fixed-electric-potential-side capacitor electrode; and the pixel electrode and the second relay electrode being electrically connected to each other via a second contact hole formed through the interlayer insulation film and the dielectric film.

5. The electro-optical device according to claim 4, wherein the pixel-electric-potential-side capacitor electrode has a film thickness that is smaller than a film thickness of the data line and that is smaller than a film thickness of the fixed-electric-potential-side capacitor electrode.

6. The electro-optical device according to claim 1, wherein each of the pixel-electric-potential-side capacitor electrode and the fixed-electric-potential-side capacitor electrode is made of a metal film.

7. The electro-optical device according to claim 6, further comprising a plurality of capacitor lines formed over the substrate, each of the capacitor lines being electrically connected to the fixed-electric-potential-side capacitor electrode.

8. The electro-optical device according to claim 6, wherein the data line is made of a metal film.

9. An electronic apparatus that is provided with the electro-optical device according to claim 1.

* * * * *